(12) United States Patent  (10) Patent No.: US 7,892,471 B2
Burke et al.  (45) Date of Patent: Feb. 22, 2011

(54) WIRELESS ENABLED DEVICE

(75) Inventors: Aaron Burke, Hamilton, MA (US); Joseph William Muldoon, West Boylston, MA (US)

(73) Assignee: Millipore Corporation, Billerica, MA (US)

( * ) Notice: Subject to any disclaimer, the term of this patent is extended or adjusted under 35 U.S.C. 154(b) by 570 days.

(21) Appl. No.: 11/985,471

(22) Filed: Nov. 15, 2007

(65) Prior Publication Data
US 2008/0213135 A1  Sep. 4, 2008

Related U.S. Application Data

(60) Provisional application No. 60/873,712, filed on Dec. 8, 2006.

(51) Int. Cl.
*B29C 65/02* (2006.01)
(52) U.S. Cl. .......................... 264/241; 73/863; 96/417; 210/85; 210/541; 156/292; 264/248; 264/249; 340/572.8; 422/538; 422/544; 285/21.1
(58) Field of Classification Search .......... 96/417–424; 156/73.1, 73.6, 272.2, 292, 308.2, 309.6; 210/85–96.2, 232, 435, 445, 450, 650, 739, 210/541; 264/241, 248, 249, 298, 299; 340/572.8; 73/863; 422/103, 538, 544; 285/21.1; 604/408
See application file for complete search history.

(56) References Cited

U.S. PATENT DOCUMENTS 3,458,380 A  7/1969  Kipp
4,045,350 A * 8/1977  Kupf et al. ................ 210/232
4,992,166 A * 2/1991  Lowsky et al. ............. 210/130
5,328,597 A * 7/1994  Boldt et al. ................. 210/87
6,471,853 B1 * 10/2002 Moscaritolo ................ 210/85
7,699,989 B2 * 4/2010  Grzonka et al. ............ 210/650
7,705,733 B2 * 4/2010  Tethrake et al. .......... 340/572.8
2002/0144938 A1 * 10/2002 Hawkins et al. ............. 210/85
2005/0092661 A1 * 5/2005 Warren et al. ............... 210/91
2006/0032792 A1 * 2/2006 Warren et al. ............... 210/87
2006/0068161 A1  3/2006  Enokida et al.

FOREIGN PATENT DOCUMENTS

DE  103 28 695 A1  10/2004
EP  1 288 692  3/2003
GB  1440 645  6/1976
JP  2006-12024 A  1/2006
WO  WO 2007/049039  5/2007

OTHER PUBLICATIONS

China Patent Application No. 200710164682.X, Office Action dated Apr. 2, 2010 and English Translation (8 pgs.).

* cited by examiner

*Primary Examiner*—Joseph W Drodge

(57) ABSTRACT

The invention described herein provides an embedded wireless device such as a RFID tag molded into separate housing formed of any thermoplastic material compatible to that of the plastic material as the device to which the housing is to be attached. Subsequently, the housed tag assembly can be thermally bonded onto the device through many means which are well known and accepted in the industry.

8 Claims, 4 Drawing Sheets

WIRELESS ENABLED DEVICE

CROSS-REFERENCED RELATED APPLICATIONS

This application claims the benefit of U.S. Provisional Application No. 60/873,712 filed Dec. 8, 2006 which is hereby incorporated by reference in it's entirety.

The present invention relates to a product and method of making such a device for encapsulating a wireless component and securing it to a thermoplastic surface of a desired device. More particularly, it relates to a product and method of making such a device for encapsulating a wireless component, such as an RFID tag, and securing it to a thermoplastic surface of a desired device such as a filter or filter capsule, biobag and the like.

BACKGROUND OF THE INVENTION

Due to many factors including increased use of manufacturing control and documentation systems, lot traceability, ease of use and item identification, customers require item specific information such as catalog number, lot and serial identification for each filter, media and component used in their process. Currently, techniques such as printing, engraving, laser marking, labeling and bar-coding are used to transfer this information to customers.

For filter cartridges and other products which are wholly in the fluid path during use, adhesives, inks or any foreign matter are extremely undesirable as they may leach extractable matter into the final product which needs to be identified, quantified and if at too high a level removed. Therefore engraving and laser marking are currently preferred to identify filter cartridges. Unfortunately, this requires the end user to manually read and write down or key in information. This process is subject to error because the engraving is difficult to read on the translucent part. Because of number of times a cartridge needs to be tracked through receiving, multiple uses, storage and disposal, customers are in need of a better way.

The use of wireless tags such as RFID tags is just being explored as a potential solution. Such tags generally comprise a wireless transponder of some type and an antenna, both of which are mounted to a card or other substrate and generally encapsulated in epoxy or urethane. These tags have been adhered to products through the use of adhesives, especially self-stick adhesives. The issue of adhesives especially in the fluid path remains. Additionally, adhesives tend to degrade over time and may fail losing the tag and making the entire system unworkable.

Recent advances in in-mold labeling combined with wireless identification technology offer a solution to the problem by eliminating traditional adhesive wireless tags and embedding wireless tags into the device itself, isolating it from the fluid streams. However, the tooling to make such a change is costly and needs to be specific to each part modified with a tag, thus slowing adoption and implementation.

SUMMARY OF THE INVENTION

The invention described herein solves this problem by providing an embedded wireless device, such as a RFID tag or Zigbee device, molded into separate housing formed of any thermoplastic material which is compatible with the plastic material of the device to which the tag and housing is to be attached. Subsequently, the tag assembly can be bonded such as by thermal bonding, solvent bonding or adhesive bonding, onto the device as is well known in the industry.

Preferably one surface of the housing has two or more spaced apart protrusions which center and aid in the attachment of the housing to the device. More preferably, these protrusions act as energy directors that are preferentially melted and used to attach the housing to the device. In addition, these protrusions also form the bulk of the necessary sacrificial material for mechanical attachment.

The end result is that the user has to accept no new materials into their processes and can leverage all the benefits of wireless technology on a multitude of products.

A further advantage to this device is that next generation wireless tags will provide customers with real time process information by incorporating sensors into the tag. These tags will need to be in the fluid path and having a universal means of attachment with the fewest new materials of construction will be a great advantage.

In one embodiment, the protrusions are made of thermoplastic and are bonded by an energy based heating such as ultrasonic or vibration welding. The protrusions act as energy directors and preferentially absorb the energy at their surfaces adjacent the device against which they have been placed to form a molten thermoplastic plastic bond between the housing and the device. In this embodiment, the thermoplastic of the housing and the device to which it is attached must be compatible and be capable of bonding to each other. In another embodiment, they are compatible and one has a lower melting point than the other. In a further embodiment, they are compatible and the protrusions have a lower melting point than the device surface. In an additional embodiment the plastics are the same.

Suitable thermoplastics include but are not limited to polyethylene, polypropylene, EVA copolymers, alpha olefins and metallocene copolymers, PFA, MFA, polycarbonate, vinyl copolymers such as PVC, polyamides such as nylon, polyesters, acrylonitrile-butadienestyrene (ABS), polysulphone, polyethersulphone, polyarylsulphone, polyphenylsulphone, polyacrylonitrile, polyvinylidene fluoride (PVDF), and blends thereof.

IN THE DRAWINGS

DETAILED DESCRIPTION OF THE INVENTION

Figure 1:
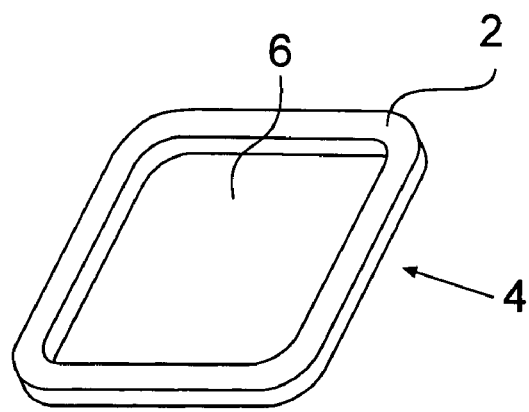
FIG. 1 shows a portion of the device containing the recess in perspective view.

FIG. 1 shows a molded housing 2 with a first closed surface 4 and a recess 6 for the receipt of a wireless device (not shown).

Figure 2:
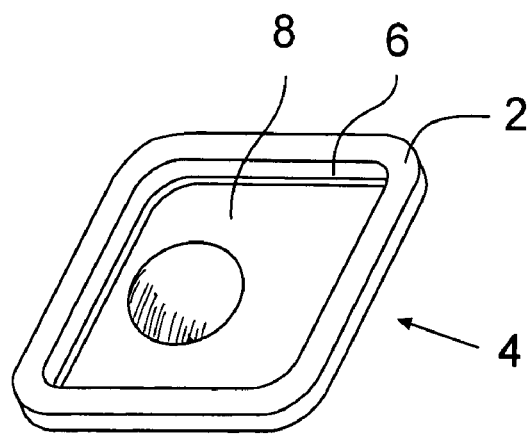
FIG. 2 shows a portion of the device containing the recess and the wireless component in the recess in perspective view.
Figure 3:
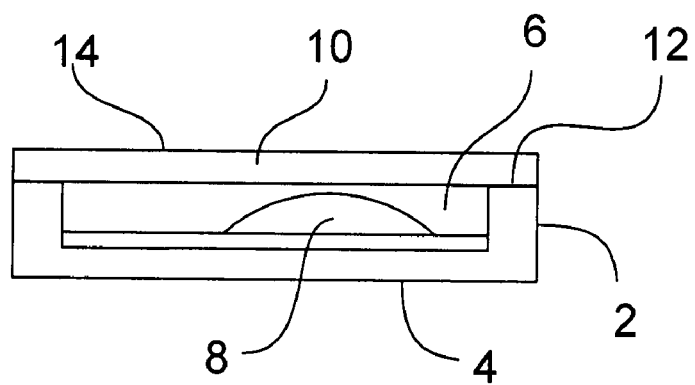
FIG. 3 shows one embodiment of the housing with the wireless component in the recess and covered by the second piece of the housing in cross-sectional view.

FIG. 2 shows a wireless device 8 in the recess 6 of the housing 2. In this particular example, the wireless device is a RFID tag and antenna assembly although it could be any device that uses wireless protocols like Zigbee, Bluetooth, or WUSB.

The recess is then sealed by a cover 10 preferably formed of the same plastic as the housing 2 although all the cover 10 need be is compatible with the plastic of the housing 2 so it can be sealed in a liquid tight manner to the housing. The cover 10 of the housing can be a separately molded or preformed piece that is attached to the housing 2 at the rim 12 by heat, ultrasonic or vibration welding, adhesive, solvent bonding and the like. Alternatively and preferably, it can be molded directly over the wireless device and recess such as by injection molding.

Figure 4:
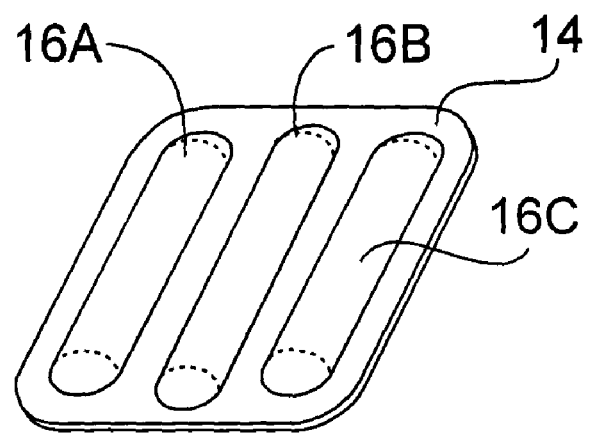
FIG. 4 shows one preferred embodiment of an outer surface of the device containing the protrusions in perspective view.

Preferably, one surface of the device, either the first closed surface 4 of the housing 2 or a surface 14 of the cover 10 as shown in FIG. 4 (in this instance as shown it is the cover 14) has two or more protrusions 16 formed on it and these protrusions 16 extend away from the surface 14.

Figure 5:
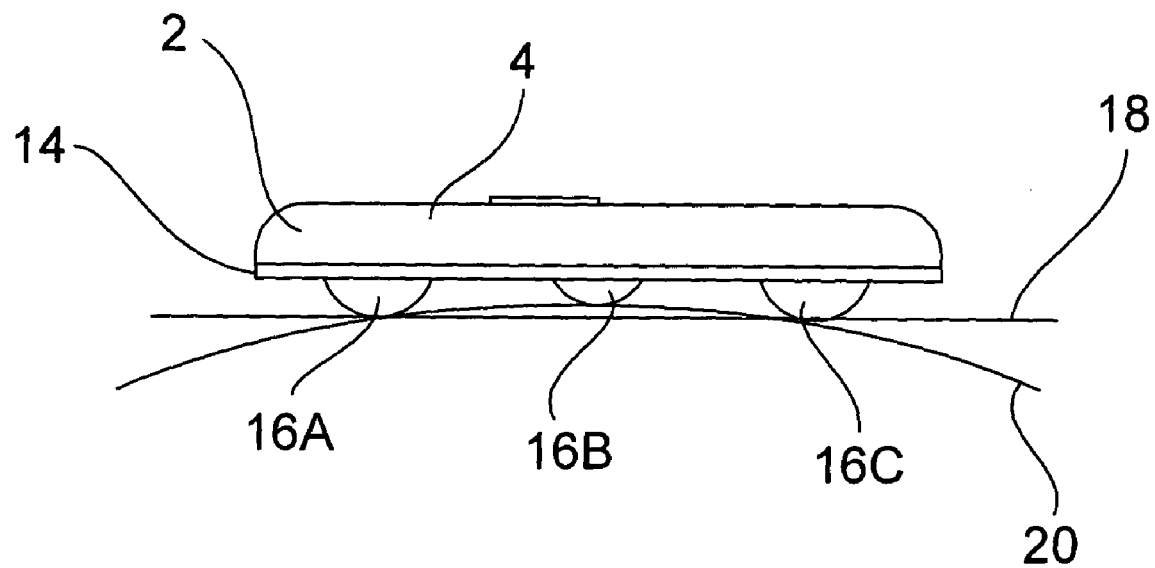
FIG. 5 shows one preferred embodiment of the present invention mounted against a surface to which it is to be bonded in perspective view.

In the embodiment of FIG. 4 is shown one preferred style in which there are three protrusions 16A, B and C, two of which 16A and C are the same size, shape and other dimensions. The third protrusion 16B is of different size and other dimensions, in this embodiment, by height and length. This style of device allows one to place the encapsulated wireless component (not shown) in the housing 2 against either a flat 18 or a rounded surface 20 of a device (not shown) to which the wireless component is to be attached, as shown in FIG. 5, and still maintain good contact and center the wireless device and housing on that surface.

The wireless device in the housing is attached to the surface of the device on which it is mounted by any conventional means such as solvent bonding, adhesives, thermal bonding, such as by ultrasonic or vibration welding or by radiant heat or inductive heat of the plastic of the protrusions and/or the plastic of the device.

Preferably, the protrusion are made of thermoplastic and are bonded by an energy based heating such as ultrasonic or vibration welding. The protrusions in addition to being stabilizers or centering devices also act as energy directors and preferentially absorb the energy at their surfaces adjacent the device against which they have been placed to form a molten thermoplastic plastic bond between the housing and the device. In this embodiment, the thermoplastic of the housing and the device to which it is attached must be compatible and be capable of bonding to each other. In another embodiment, they are compatible and one has a lower melting point than the other. In a further embodiment, they are compatible and the protrusions have a lower melting point than the device surface. In an additional embodiment the plastics are the same.

The protrusions are further distinguished in that they are the sacrificial material used to mechanically bond to the mating surface. Their dimensions, shape, and spacing can be customized to supply the sufficient amount of sacrificial material necessary to bond. This sacrificial material is the only deformed component of the embodiment, where the electronics and immediately surrounding enclosing material is not directly used in the bonding. Likewise the surface to which it bonds such as the outer surface of a filter housing or filter capsule, or a biobag or a disposable probe, valve or connector is not deformed or distorted.

Suitable thermoplastics include but are not limited to polyethylene, polypropylene, EVA copolymers, alpha olefins and metallocene copolymers, PFA, MFA, polycarbonate, vinyl copolymers such as PVC, polyamides such as nylon, polyesters, acrylonitrile-butadiene styrene (ABS), polysulphone, polyethersulphone, polyarylsulphone, polyphenylsulphone, polyacrylonitrile, polyvinylidene fluoride (PVDF), and blends thereof.

Figure 6A:
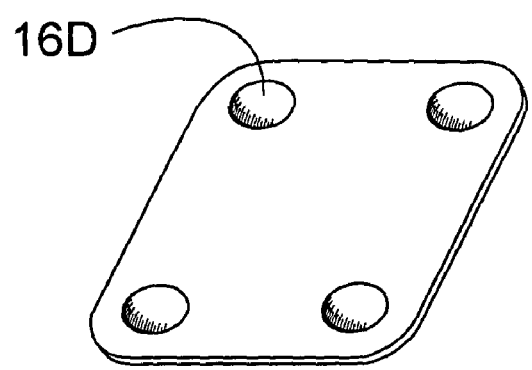
FIG. 6A-6E show other embodiments of the outer surface of the device containing the protrusions in perspective view.
Figure 6B:
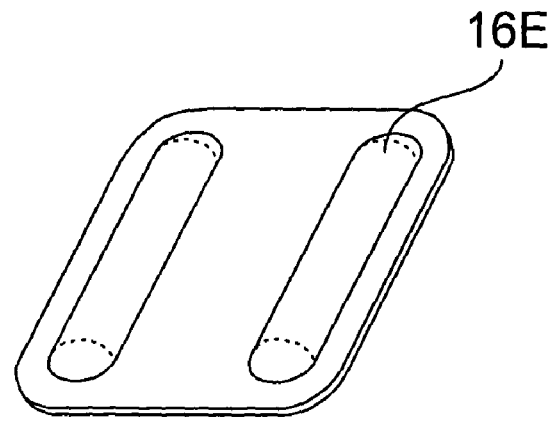
Figure 6C:
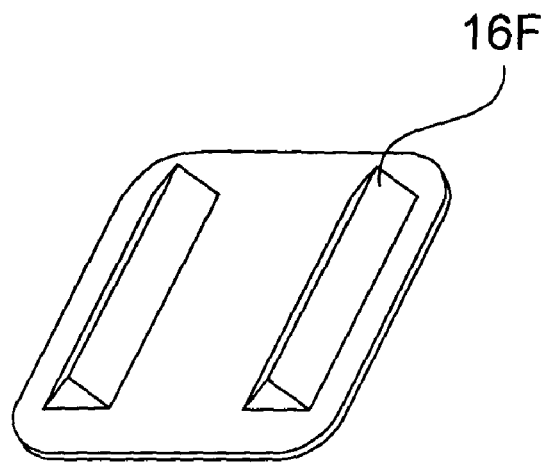
Figure 6D:
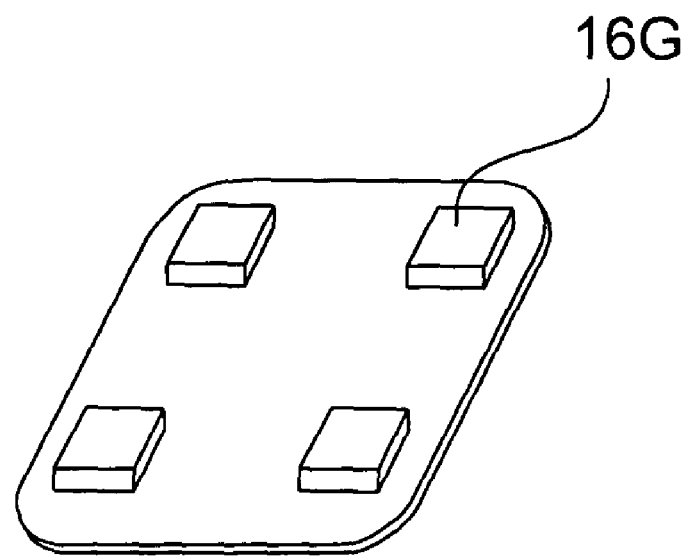
Figure 6E:
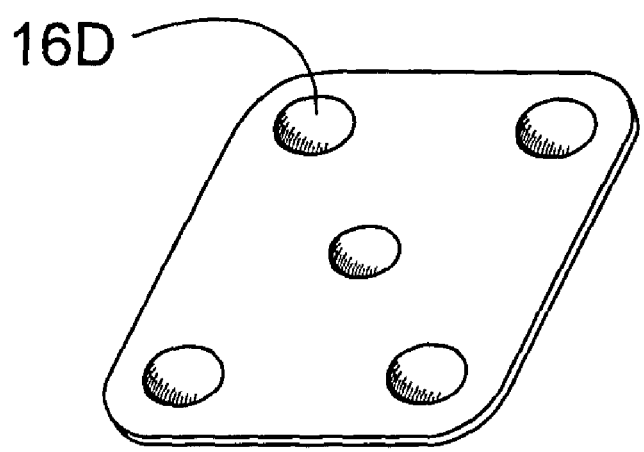

Other shapes can be used for the protrusions 16 some of which are shown in FIGS. 6A-D. They may be formed in the shape of a circle 16D of FIG. 6A, oval, 16E of FIG. 6B, pyramids, 16F of FIG. 6C or rectangular or square 16G of FIG. 6D. Other shapes and combinations will be obvious to one of ordinary skill in the art. As shown in FIGS. 6A and D there can be 4 protrusions, while in FIGS. 6B and C there are only 2. One could also use 5 protrusions as shown in FIG. 6E. Other numbers of protrusions can be used and would be obvious to one of ordinary skill in the art.

The device can be made by several methods.

A first method is to preform a thermoplastic device formed of a housing having a first closed substantially planar inner surface and a first outer surface and at least one recess for holding the component. A wireless component, such as an RFID chip and antenna is then placed into the at least one recess. It may simply be laced in loosely or if desired it be adhered in place using an adhesive such as a hot melt thermoplastic, if desired. A cover is then overmolded to at least one recess and component with a thermoplastic to encapsulate the component and form a second outer surface of the housing. Either first outer surface or the second outer surface of the housing has two or more spaced apart protrusions extending away from the selected outer surface.

A second method is to preform a thermoplastic device formed of a housing having a first closed substantially planar inner surface and a first outer surface and at least one recess for holding the component. A wireless component, such as an RFID chip and antenna is then placed into the at least one recess. It may simply be laced in loosely or if desired it be adhered in place using an adhesive such as a hot melt thermoplastic, if desired. A cover is then overmolded to the at least one recess and component with a thermoplastic to encapsulate the component and form a second outer surface of the housing. Either first outer surface or the second outer surface of the housing has two or more spaced apart protrusions extending away from the selected outer surface. One then holds the two or more protrusions of the device against a thermoplastic assembly such as a cartridge outer housing and at least partially melt the two or more protrusions to form a bond between the thermoplastic assembly and the thermoplastic protrusions of the device.

A third method is to mold a thermoplastic device formed of a housing having a first closed substantially planar inner surface and a first outer surface and at least one recess for holding the component. A wireless component, such as an RFID chip and antenna is then placed into the at least one recess while still in the mold. A cover is then overmolded to the at least one recess and component with a thermoplastic to encapsulate the component and form a second outer surface of the housing. Either first outer surface or the second outer surface of the housing has two or more spaced apart protrusions extending away from the selected outer surface of the device.

A fourth method is to preform a thermoplastic device formed of a housing having a first closed substantially planar inner surface and a first outer surface and at least one recess for holding the component. A wireless component, such as an RFID chip and antenna is then placed into the at least one recess. It may simply be laced in loosely or if desired it be adhered in place using an adhesive such as a hot melt thermoplastic, if desired. A preformed cover is then placed over the at least one recess and component with a thermoplastic and bonded to it by a thermal bond between the housing and cover such as by radiant heat, vibration or ultrasonic welding or by a hot melt adhesive or the like to enclose the component and form a second outer surface of the housing. Either first outer surface or the second outer surface of the housing has two or more spaced apart protrusions extending away from the selected outer surface of the device.

A fifth method is to preform a thermoplastic device formed of a housing having a first closed substantially planar inner surface and a first outer surface and at least one recess for holding the component. A wireless component, such as an RFID chip and antenna is then placed into the at least one recess. It may simply be laced in loosely or if desired it be adhered in place using an adhesive such as a hot melt thermoplastic, if desired. A preformed cover is then placed over the at least one recess and component with a thermoplastic and the housing and cover are overmolded to bond the cover and housing together and to enclose the component and form a second outer surface of the housing. Either first outer surface or the second outer surface of the housing has two or more spaced apart protrusions extending away from the selected outer surface of the device.

Other methods can also be used as part of the present invention and would be obvious to one of ordinary skill in the art.

EXAMPLE

A wireless device, in this example a RFID tag formed of read/write chip and an antenna, available from Tagsys S.A. of France as catalog item Ario™ SM-ISO RFID tag was selected for this example. The wireless device had dimensions of 14 mm wide by 14 mm long and 2 mm high.

A housing having a cavity with inner cavity dimensions slightly larger than the dimensions of the wireless device was formed of polypropylene.

The wireless device was tested before insertion into the housing by reading the device with a handheld reader available from Tagsys.

A cover was formed over and into the cavity of the housing to encapsulate the wireless device within the cavity by an injection molding machine.

The outer surface of the housing opposite the cavity opening contained three projections in the form of rounded rectangular shapes similar to those shown in FIG. 4.

The housing was placed against a thermoplastic (polypropylene) outer surface of a SHF filter available from Millipore Corporation of Billerica, Mass. and bonded to the outer surface of the filter by heating the projections and the housing with standard vibration thermal welder for a period of approximately 1 minutes while applying pressure between the two. The vibration was then stopped, the filter and housing allowed to cool and the wireless device was then tested and found to be capable of both reading and writing information.

What is claimed:

1. A process for attaching a wireless electronic component in a thermoplastic device to a thermoplastic assembly comprising the steps of:
   a. forming a thermoplastic device formed of a housing having a first closed substantially planar inner surface and a first outer surface and at least one recess for holding the wireless electronic component;
   b. placing the wireless electronic component into the at least one recess;
   c. overmolding the at least one recess and wireless electronic component with a thermoplastic to encapsulate the wireless electronic component and form a second outer surface of the housing; wherein either the first outer surface or the second outer surface of the housing has two or more spaced apart protrusions extending away from the outer surface;
   d. selecting a thermoplastic assembly; and
   e. holding the two or more protrusions of the device against an outer surface of the thermoplastic assembly and at least partially melting the two or more protrusions to form a bond between the outer surface of the thermoplastic assembly and the thermoplastic protrusions of the device.

2. The process of claim 1 wherein the number of protrusions is at least three.

3. The process of claim 1 wherein the number of protrusions is at least three and the protrusions act as centering devices and energy directors for thermally bonding the device to the assembly.

4. The process of claim 1 wherein the assembly is selected from the group consisting of a filter cassette, a filter cartridge, a filter housing, a biobag, a sampling device, a valve, a connector, tubing and combinations thereof.

5. The process of claim 1 wherein the protrusions are bonded to the thermoplastic outer surface of the assembly through the use of heat generated from a method selected from the group consisting of vibration welding, ultrasonic welding and radiant heat.

6. The process of claim 1 wherein the thermoplastic of the device and the thermoplastic of the assembly to which it is attached are compatible.

7. The process of claim 1 wherein the number of protrusions is at least three and at least one of the protrusions is of a different size and dimension from the other protrusions.

8. The process of claim 1 wherein the number of protrusions is at least three and at least one of the protrusions is of a different size and dimension than the other protrusions and wherein the size and dimension is selected from the group consisting of length and height.

* * * * *